April 8, 1969
D. G. GALLIE ET AL
3,437,371
VEHICLE AIR STREAM ANTITURBULENCE MECHANISM
Filed Aug. 15, 1966
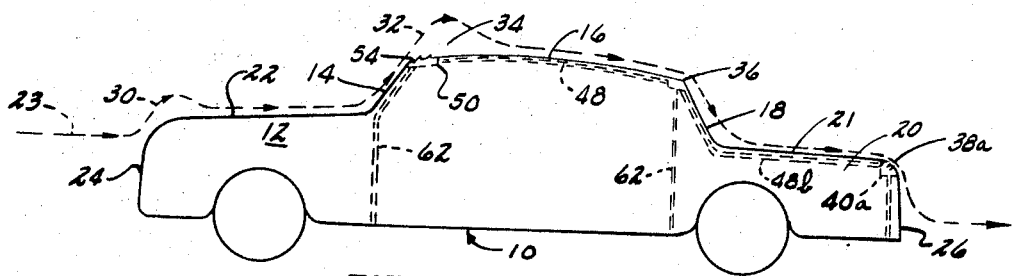
FIG_1
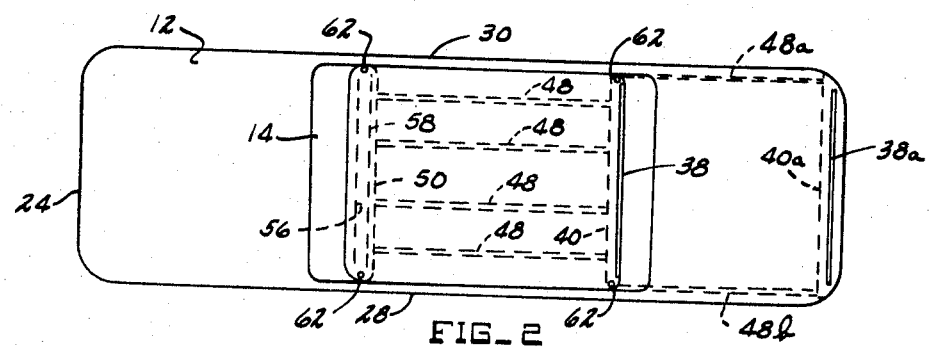
FIG_2
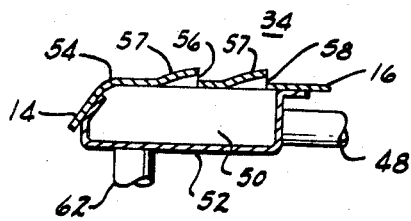
FIG_4
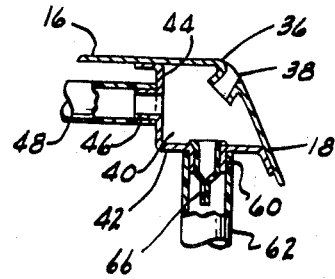
FIG_3
INVENTORS
GUNNAR HESKESTAD
BY DANIEL G. GALLIE
TENNES I. ERSTAD
JOHN E. MCRAE
ATTORNEYS

United States Patent Office 3,437,371
Patented Apr. 8, 1969

3,437,371
VEHICLE AIR STREAM ANTITURBULENCE MECHANISM
Daniel G. Gallie, 6757 Cortland, Allen Park, Mich. 48101, and Gunnar Heskestad, 34 Seymour Terrace, Piscataway, N.J. 08854
Filed Aug. 15, 1966, Ser. No. 572,462
Int. Cl. B60j 9/00; B60h 1/26
U.S. Cl. 296—1      9 Claims

ABSTRACT OF THE DISCLOSURE

This invention proposes an air suction means for drawing air out of the air stream passing over a vehicle body, and air exhaustion means for ejecting the air out of the vehicle body at a point remote from the air suction means. The air suction means is located at a point on the vehicle where it can bend or draw the air more closely down against the vehicle body surface, and the air exhaust means is located at a point on the vehicle body where it can eject air to fill a partial vacuum which would otherwise exist on the body surface. The arrangement promotes a streamline flow of air over the vehicle body, thereby minimizing air turbulence and reducing fuel consumption when the vehicle is traveling at high speed.

---

This invention relates to road vehicles, especially to means for reducing turbulence in the air stream associated with moving vehicles.

Previously it has been suggested that undesired turbulence could be reduced by forming suction slots in the corners between certain trailing bluff surfaces and certain streamline surfaces. For example, in a truck it was proposed to form a suction slot at the corner between the rear wall and roof; a blower was arranged within the truck to suck outside air into the slot. At high vehicle speeds the air sucked into the slot would tend to draw the main air stream around the roof-rear wall corner where it could flow downwardly along the external face of the rear wall for some distance. This would tend to fill the wake area immediately behind the vehicle and reduce the extent of the turbulent wake.

The present invention uses the edge suction principle in combination with a new suction source. In the new arrangement the suction source is provided by openings formed in the vehicle roof just rearwardly of its front edge. At high vehicle speeds the air coming up off of the front windshield tends to continue to flow up after reaching the roof surface; this upflowing air forms a relatively low pressure area above the front portion of the roof. We use this low pressure area as a suction source, thus eliminating the need for a mechanically powered blower. We additionally secure the further advantage of minimizing turbulence as well as decreasing the vacuum level which would otherwise be generated along the roof surface just above the roof front portion. The end result is improved stability by reducing the vehicle lifting force and reduced fuel consumption by limiting the turbulence.

The general object of the invention is to provide improved low cost means for minimizing air separation and the resulting turbulence normally associated with fast-moving vehicles.

In the drawings:

FIG. 1 is a schematic side elevational view of a vehicle having the invention incorporated therein.

FIG. 2 is a top plan view of the FIG. 1 vehicle.

FIG. 3 is an enlarged sectional view of an air intake means used in the FIG. 1 vehicle.

FIG. 4 is an enlarged sectional view of an air exhaust means used in the FIG. 1 vehicle.

Referring in greater detail to FIG. 1, there is shown an automotive vehicle 10 having a hood area 12, front windshield 14, roof 16, rear window area 18 and rear deck 20. Hood 12 is provided with a streamline upper surface 22 and a bluff frontal surface 24. Rear deck 20 is provided with an upwardly facing streamline surface 21 and a rear trailing bluff surface 26. The term "bluff surface" comprehends any surface which extends generally across or transverse to the general direction taken by the air stream as the vehicle moves forwardly; the term would thus comprehend any of surfaces 24, 14, 18 and 26.

The illustrated vehicle includes conventional side surfaces 28 and 30 extending generally parallel to the direction of the air stream. Surfaces 28, 30, 22, 16 and 20 may be considered "streamline surfaces" in the sense that the air moves evenly therealong without appreciable turbulence.

Dotted line 23 shows the general pattern of the air stream as the vehicle moves leftwardly. It will be noted that as the air contacts the frontal bluff surface 24 it is deflected upwardly as at 30. Thereafter the air sweeps down and attaches to the hood surface 22 and moves evenly therealong until it reaches the windshield 14. As the air sweeps up along the windshield it tends to keep moving upwardly due to its momentum, as at 32, even after reaching the level of roof 16. The air stream thus forms a low pressure area in the space generally designated by numeral 34. Eventually the air returns to the roof surface and flows therealong attached until it reaches corner 36. Instead of flowing smoothly down along the surface of window 18 the air tends to keep moving horizontally. This tendency of the air stream to move past or separate from the surface of window 18 results in a combination of detrimental turbulence and a low pressure region in the space above the forward portion of rear deck surface 21.

In order to minimize the undesired flow separation and resultant turbulence and low pressure, we provide a suction slot 38 (FIGS. 2 and 3) at corner 36. As shown best in FIG. 3, the suction slot communicates with an air intake chamber 40 formed by a sheet metal partition 42 extending across the entire width of the vehicle. Vertical wall portion 44 of partition 42 is provided with four or more hollow tubular sleeves 46 which individually receive the ends of plastic tubes 48. As seen in FIG. 2, these plastic tubes extend forwardly within the vehicle roof area to a chamber 50 formed by a sheet metal partition 52. As in the case of chamber 40, chamber 50 also extends across the entire width of the vehicle.

Previously it was mentioned that space 34 above the front portion of roof 16 constitutes a low pressure area. We utilize this low pressure area to draw air from chamber 50 into space 34. Thus, air exhaust openings are formed at 56 and 58, as by lancing portions of the roof material upwardly. The lancing operations form rearwardly flaring projections 57 which cause the air to flow in a rearward direction as it is drawn through openings 56 and 58; the air is thus more easily assimilated into the air stream. As shown in FIG. 2, there are five lanced portions 57 arranged in each of two rows extending across the width of the vehicle. However the number of lanced openings and the dimension thereof may be varied within suitable limits. If desired, the separate discontinuous openings 56 and 58 may be replaced by a slot similar to slot 38.

During forward movement of the vehicle, especially at high speeds above 60 m.p.h., the low pressure space 34 causes air to be drawn out of chamber 50 through air exhaust openings 56 and 58. This out-flow of air from chamber 50 causes new air to be drawn into the chamber from the tubes 48. The tubes 48 in turn extract air from the chamber 40, which thus effects a suction condition at the air intake slot or opening 38. The air drawn in through slot 38 tends to draw the main air stream downwardly onto the surface of rear window 18. The air thus has a lessened tendency to separate from the rear window, and consequently has less turbulence in the space above the forward portion of rear deck surface 21, constituting a more positive pressure across the rear window surface.

The illustrated arrangement not only minimizes turbulence in the space behind window 18 but also tends to minimize turbulence in space 34. Thus the air flowing out of openings 56 and 58 tends to fill the semi-vacuum in space 34 and thus causes the general air stream to more closely follow the contour of the vehicle. The net effect is to reduce turbulence and its drag effect on the vehicle, thus contributing to increased fuel economy, especially when the vehicle is driven at speeds above 60 m.p.h.

A further advantageous result is the stabilizing effect which the improved flow pattern has on the vehicle. Thus, by minimizing the vacuum condition in space 34 we reduce the lifting action which such vacuum would impose on the vehicle. As a result, more weight is put onto the wheels, thereby improving the vehicle control and stability. A somewhat similar effect is achieved by the reduction in turbulence in the space above the forward portion of rear deck surface 21.

Referring to FIG. 3, there is shown a tubular projection 60 extending downwardly from partition 42 to form a mounting connection for a plastic tube 62. The purpose of tube 62 is to form a drain for any water which would otherwise accumulate in chamber 40, as by rain or washing of the vehicle. Tube 62 would, if permanently kept open, detract from the suction attained in tubes 48. Therefore the drainage tube may be provided with a check valve, shown as a rubber boot 66 having a slit in its lower end to permit water to flow downwardly out of chamber 40, but being normally closed to prevent air from flowing upwardly through tube 62 into chamber 40. FIG. 3 shows a single tube 62, but preferably two such tubes are provided, one adjacent each end of chamber 40 as shown schematically in FIG. 2. With such an arrangement, a vehicle can assume any desired inclination or tilt while still having adequate water drainage. Chamber 50 is also subject to accumulation of water therein. Therefore it is also preferably provided with drainage tubes 62 adjacent its opposite ends. These tubes are preferably equipped with a check valve similar to valve 66.

The illustrated vehicle includes a rear transverse suction chamber 40a having a construction and function similar to chamber 40 in FIG. 3. Thus, air flowing off of rear deck 20 is drawn into an air intake slot 38a at the corner between surfaces 21 and 26. The extracted air causes the main air stream to thus flow smoothly downwardly along the external surface 26, thus minimizing the turbulence which would otherwise exist in the wake of the vehicle.

As shown best in FIG. 2, chamber 40a may be equipped with two air tubes 48a and 48b extending forwardly and upwardly to chamber 40. The vacuum condition in chamber 40 may thus be transmitted to tubes 48a and 48b, and thence to chamber 40a. Chamber 40a may be located in an upwardly swingable trunk lid, in which case the tubes 48a and 48b may be sectionalized, the rearward portion of each tube being located in the trunk lid and the front portion being located in the vehicle body per se.

It will be appreciated that chambers 40 and 40a may be used together, or either may be used alone. If both are used there will be a more favorable result, i.e., a more pronounced improvement in fuel economy and vehicle stability. Chamber 40 is believed to have a greater effect than chamber 40a.

As shown in FIG. 1, the air exhaust chamber 50 is located just rearwardly of the corner 54 formed between the windshield and roof. This appears to be the most favorable location, since a very significant low pressure area exists adjacent thereto. It is conceivable that some favorable results could be achieved with chamber 50 located at the junction between bluff surface 24 and streamline surface 22. The air pattern appears to provide as low a pressure in the space above this area as in space 34 but is more remote from the rear end of the vehicle. Hence the illustrated location is believed to be the optimum in most cases.

As shown in the drawings the air intake chamber 40 is separate from the air exhaust chamber 50, said chambers being interconnected by tubes 48. If desired, chambers 40 and 50 could be formed as part of a common chamber, in which case tubes 48 would be eliminated in favor of a horizontal liner or partition extending beneath roof 16 and spanning the entire space between windshield 14 and rear window 18. The intermediate portion of the common chamber would form a passage between the air intake opening 30 and air exhaust openings 56 and 58.

The invention is believed applicable to passenger vehicles of the sedan type as illustrated, as well as station wagons and larger vehicles such as buses and trucks. In the case of station wagons, trucks and buses it might prove beneficial to provide air intake chambers in the vertical corners formed between the vehicle rear wall and side walls. Such air intake chambers would turn the air stream around the vertical corners and thus tend to fill the space in the wake of the vehicle so as to minimize the turbulence and drag effect.

It is claimed:

1. A road vehicle comprising a vehicle body having bluff leading surfaces, bluff trailing surfaces, and interconnecting streamline surfaces; air intake means operable to draw air into the vehicle body at a juncture between one of the bluff trailing surfaces and one of the streamline surfaces; air exhaust means operable to exhaust air out of the vehicle body just rearwardly of the juncture between one or the bluff leading surfaces and one of the streamline surfaces; and passage means interconnecting the intake means with the exhaust means.

2. The road vehicle of claim 1 wherein the intake means and exhaust means comprise separate chambers extending transversely across the vehicle body, said passage means comprising a series of generally parallel passages extending forwardly from the air intake chamber to the air exhaust chamber.

3. The road vehicle of claim 2 wherein each one of the air chambers is provided with at least one water drainage opening.

4. The road vehicle of claim 1 wherein one of the bluff leading surfaces comprises a windshield, one of the bluff trailing surfaces comprises a rear window, and one of the streamline surfaces comprises a roof; said air intake means being located at the juncture between the roof and the rear window; said air exhaust means being located in the roof just rearwardly of its juncture with the windshield.

5. The road vehicle of claim 1 wherein the air exhaust means comprises at least two rows of air exhaust openings extending transversely across the vehicle body.

6. The road vehicle of claim 1 wherein the air exhaust means comprises a rearwardly flaring projection protruding out of the general contour of said one streamline surface, said flaring projection presenting a miniature bluff trailing surface to the air stream, said miniature bluff trailing surface having openings therein which cause the exhausted air to flow with the external air stream.

7. The road vehicle of claim 1 wherein one of the bluff leading surfaces comprises a vehicle windshield, and one of the streamline surfaces comprises a vehicle roof; said air exhaust means being located in the roof just rearwardly of its juncture with the windshield.

8. The road vehicle of claim 1 wherein said one streamline surface comprises a vehicle roof; said air intake means extending transversely across the rear edge of the roof, and said air exhaust means extending transversely across the front edge of the roof; the interior spaces adjacent the roof front and rear edges constituting air chambers, each chamber having at least one water drainage tube depending therefrom; and a check valve in each drainage tube allowing water to drain down the tube but preventing substantial flow of air up the tube.

9. The road vehicle of claim 1 wherein one of the bluff leading surfaces comprises a vehicle windshield, and one of the streamline surfaces comprises a vehicle roof; said air intake means being a first slot means extending transversely across the rear edge of the roof, and said air exhaust means being a second slot means extending transversely across the front edge of the roof in a rearwardly facing attitude; said passage means extending forwardly within the roof from the first slot means to the second slot means; said passage means being sealed from the vehicle body interior so that all air admitted through the first slot means must be ejected through the second slot means.

References Cited

UNITED STATES PATENTS

| | | | |
|---|---|---|---|
| 2,361,924 | 11/1944 | Boynton | 296—1 |
| 2,087,651 | 7/1937 | Mygland | 296—91 X |
| 1,435,490 | 11/1922 | Mitchell | 296—91 |

PHILIP GOODMAN, *Primary Examiner.*

U.S. Cl. X.R.

105—2; 244—130